United States Patent [19]
Ganthier et al.

[11] Patent Number: 5,865,546
[45] Date of Patent: Feb. 2, 1999

[54] MODULAR KEYBOARD FOR USE IN A COMPUTER SYSTEM

[75] Inventors: James Ganthier, Spring; John Landry, Tomball, both of Tex.

[73] Assignee: Compaq Computer Corporation, Houston, Tex.

[21] Appl. No.: 920,997

[22] Filed: Aug. 29, 1997

[51] Int. Cl.[6] ........................................................ B41J 5/08
[52] U.S. Cl. ........................ 400/489; 345/168; 364/708.1; 341/22
[58] Field of Search .......................... 345/168; 400/489; 341/22; 361/680; 364/708.1

[56] References Cited

U.S. PATENT DOCUMENTS

| | | | |
|---|---|---|---|
| 4,181,966 | 1/1980 | Wenninger et al. | 364/715 |
| 4,654,818 | 3/1987 | Wetterau, Jr. | 364/900 |
| 4,794,381 | 12/1988 | Iwai | 340/700 |
| 4,870,531 | 9/1989 | Danek | 361/93 |
| 5,049,863 | 9/1991 | Oka | 340/710 |
| 5,126,955 | 6/1992 | Tomoda | 364/708 |
| 5,144,302 | 9/1992 | Carter et al. | 341/20 |
| 5,208,736 | 5/1993 | Crooks et al. | 361/393 |
| 5,440,502 | 8/1995 | Register | 364/708.1 |
| 5,500,643 | 3/1996 | Grant | 341/22 |
| 5,546,334 | 8/1996 | Hsieh et al. | 364/709.11 |
| 5,615,081 | 3/1997 | Ma | 361/680 |

*Primary Examiner*—Edgar Burr
*Assistant Examiner*—Dave A. Ghatt
*Attorney, Agent, or Firm*—Michael F. Heim; Conley, Rose & Tayon

[57] ABSTRACT

A computer system including a modular keyboard assembly allows input device modules to be inserted into the keyboard assembly. The modular keyboard assembly includes a plurality of recessed opening in which an input device module can be inserted. A connector on the input device module mates with a connector in the recessed opening, thereby providing electrical contact between the input device module and the keyboard assembly. Each input device module can be replaced by the user with a different input device module providing flexibility to the user as well as minimizing the amount of cabling that typically confronts the user. A controller in the keyboard assembly determines the types of input device modules coupled to the keyboard assembly.

21 Claims, 3 Drawing Sheets

MODULAR KEYBOARD FOR USE IN A COMPUTER SYSTEM

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to personal computer (PC) systems. More particularly, the present invention relates to an improved input/output device for use in a computer system. Still more particularly, the present invention relates to a modular keyboard that can be easily and quickly configured to suit the needs of a user.

2. Background of the Invention

Many improvements have been developed for computer systems since the introduction of the first systems. One of the areas that has experienced dramatic improvement is the user interface to the computer system, and in particular, the keyboard. Modern system keyboards have greater input capabilities than the keyboards used with earlier computer systems. The early keyboards typically had 83 input keys. To give the user additional options, keyboards with added keys (such as the CONTROL and FUNCTION keys) were introduced. However, the addition of keys to the original keyboard design had certain drawbacks.

Early computer systems required the user to type in memorized commands. For many computer users, memorizing and typing in commands to the computer via the keyboard is awkward and complicated. Because of this problem, additional or alternate data input devices to the keyboard have been developed. One of the most popular of these alternate data input devices is a mouse. To maximize the usefulness of the mouse and to simplify entry of commands into a computer, software vendors have developed graphical user interfaces (GUI's) that implement graphics, special menu technology, and the mouse. One of these graphical user interfaces has been referred to as "WIMP" (which stands for Windows, Icons, Mouse, and Pull-down) menus. The WIMP concept includes windows on the screen, icons, mouse operation, and pull-down menus containing lists of functions. By using a mouse, the user can move a pointer, a cross-hair, or a cursor across the screen. When the user presses the mouse button, she can select items from a menu, mark text in a word processing program, or paint in a drawing program. Other input devices, such as trackballs, joysticks. touch pads, to name a few, were also developed to provide easier control over the computer's operations.

Each input device must connect to the computer system, typically via an electrical cable. The connections to the computer system are often to connectors mounted in the back panel of the chassis. Connecting cables to the rear portion of a chassis can be extremely awkward and cumbersome. The chassis, for example, may be located under a desk or table or up against a wall, thereby making access to the chassis' back panel difficult. In such situations, the user must pull the computer chassis out from under the desk or away from the wall to provide sufficient access to the connectors on the back panel. Even if the chassis can be moved, the user may still have difficulty accessing the connectors on the back of the chassis. Computer system connectors are usually keyed or are constructed with a non-symmetric shape or pin arrangement to ensure cable mates properly with the connector on the back of the chassis. Although keyed connectors are necessary to ensure proper electrical connectivity, such connectors nevertheless exacerbate the user's problem in mating a cable to the back of the chassis in a situation in which the user can hardly reach the back panel connector, much less see it to determine the proper orientation of the cable connector.

Further, the length of the cable connecting an input device to the computer system usually limits where the chassis can be located. In fact, it may not be possible to place the chassis under a table or desk simply because the cable from an input device such as a trackball is not long enough to reach from the top of the table or desk to a chassis placed underneath the desk. The cable associated with the input device thus may require the computer chassis to be located on top of the desk occupying space that the user could otherwise use more efficiently. Additionally, because each input device has a cable connecting it to the computer chassis and a typical computer system may typically include numerous input devices, the cables themselves may get in the user's way, become entangled, and generally be bothersome to the user.

Many keyboards are available with one or more input devices such as trackballs, joysticks, touch pads, and the like. While some users, for example, may prefer a keyboard with a built-in trackball, other users prefer a keyboard with a built-in joystick instead of a trackball. To market computer systems for a large market segment of users, computer and keyboard manufacturers thus must manufacture keyboards that suit the needs of all potential buyers. Accordingly, computer and keyboard manufacturers manufacture differently configured keyboard systems to cover the anticipated needs of potential buyers. Re-tooling a keyboard assembly line or creating multiple assembly lines, however, to manufacture differently computer systems adds to the manufacturing cost, and thus the price, of the computer system.

Accordingly, it would be desirable to provide a computer system in which input devices can easily be connected to the computer system, thereby avoiding many of the problems identified above with previous computer systems. It would also be desirable to provide a keyboard that can be easily configured by manufacturers during assembly without the need for changes to an assembly line.

SUMMARY OF THE INVENTION

The present invention solves the deficiencies of the prior art by including a modular keyboard assembly permitting various input device modules to be inserted into the keyboard assembly and replaced as desired. The modular keyboard assembly includes a plurality of recessed openings in which input devices can be inserted. Each recessed opening includes a connector and each input device module includes a mating connector. Once an input device module is inserted into its associated recessed opening, the input device module connector mates to the connector in the associated recessed opening, and electrical connectivity between the input device module and the keyboard assembly is established. Each input device module can be replaced by the user with other input device modules providing flexibility to the keyboard manufacturer and user, as well as minimizing the amount of cabling that typically confronts the user.

The modular keyboard also includes a keyboard controller to provide an electrical interconnection between the connectors in the recessed openings (and thus the input device modules inserted therein) and the computer system. Two or more pins on each recessed opening and input device module connector are dedicated for providing a code identifying the type of input device module coupled to keyboard assembly. The keyboard controller preferably determines the types of input device modules coupled to the keyboard assembly by interpreting the identification codes during boot-up of the computer system or upon subsequent replacement of an input device module while the computer system is powered on.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DESCRIPTION OF THE PREFERRED EMBODIMENT

Figure 1:
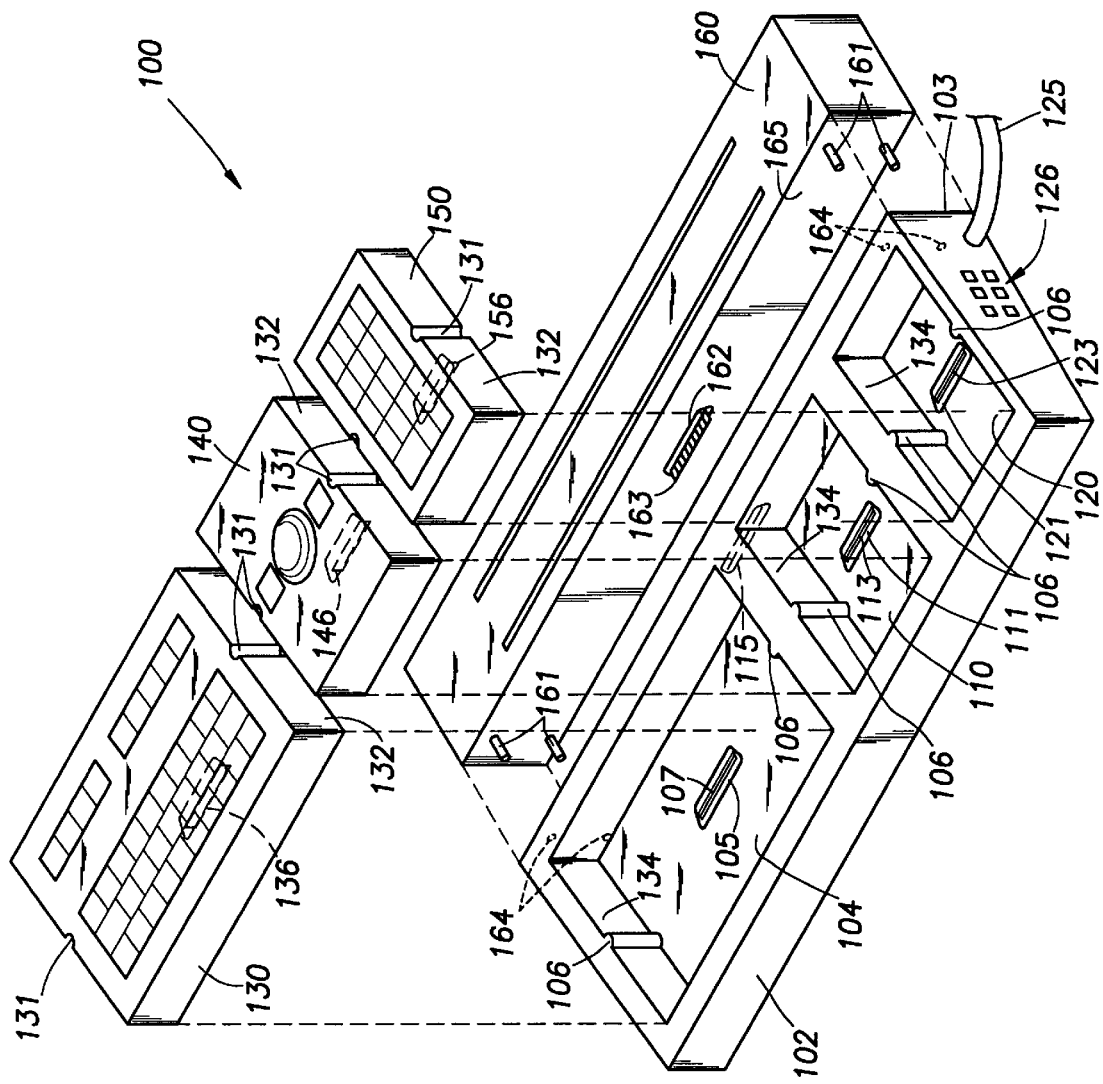
FIG. 1 is an exploded view of a modular keyboard assembly including a keyboard shell and a plurality of input device modules in accordance with a preferred embodiment.

Referring now to FIG. 1, a modular keyboard assembly 100 constructed in accordance with the preferred embodiment generally includes a keyboard shell 102 and a plurality of input device modules 130, 140, 150, and 160. The input device modules include a keyboard module 130, a display pointing and selection device such as trackball module 140, a keypad module 150, and a scanner module 160. The input device modules shown in FIG. 1 are intended only to illustrate the preferred embodiment and are not intended to limit the invention in any way. As such, other types of input devices can be used in conjunction with the keyboard shell 102. For example, the trackball module 140 can be replaced with other display pointing and selection devices such as a roller ball or touch pad and a joystick module can be used in place of the keypad module 150. Further, a number of different types of keyboard configurations can be used as keyboard module 130 such as a standard keyboard, a Microsoft Windows 95® keyboard, or a European-style (EuroAPD) keyboard. An electrical cable 125 preferably couples modular keyboard assembly 100 to a computer chassis as discussed below with respect to FIGS. 3 and 4.

The keyboard shell 102 includes a plurality of recessed openings 104, 110, 120 into which the input device modules 130, 140, 150, respectively, insert. Keyboard module 130 inserts into opening 104. Trackball module 140 inserts into opening 10, and keypad module 150 inserts into opening 120. As described in more detail below, scanner module 160 preferably mates to the rear surface 103 of keyboard shell 102. Each input device module 130–150 includes a pair of recessed grooves 131 on opposite sides 132 of each module. The shape of each recessed groove 131 preferably is semicircular in cross-section, but other cross-sectional shapes are acceptable as well. Each recessed opening includes a pair of guide rails or posts 106 built into the side wall surfaces 134 of the recessed openings. The size and shapes of the guide rails 106 is such as to allow the recesses 131 to mate with the posts when each input device module is inserted into its corresponding recessed openings. Mating guide rails 106 in each recessed opening 104, 110, 120 accordingly allow the input device modules to align properly in the recessed openings.

Referring still to FIG. 1, each input device module includes a connector for coupling to connectors on the keyboard shell 102. As shown, keyboard module 130 includes a connector 136, trackball module includes a connector 146, and keypad module 150 includes a connector 156. Each recessed opening also includes a connector for mating to connectors 136, 146, 156. Recessed opening 104 thus includes connector 105. Further, recessed opening includes connector 111, and recessed opening 120 includes connector 121. Each input device module is inserted into its corresponding recessed opening until the connector on the bottom of the input device module mates with the connector in the recessed opening thereby establishing electrical contact between the input device module and the keyboard shell 102. When the input device modules 130–150 are inserted into the keyboard shell 102, connectors 136 and 105 mate, connectors 146 and 111, and connectors 156 and 121 mate. The guide rails 106 and recessed grooves 131 help insure that the connectors will mate properly to provide a satisfactory electrical connection without damaging the pins of the connector.

Although three recessed openings are shown in the embodiment of FIG. 1, it should be recognized that fewer than three or more than three openings can be provided in shell 102 to accommodate different numbers of input device modules as desired. Further, the size and shape of each recessed opening can be any suitable size and shape in accordance with the sizes and shapes of the input device modules.

Referring still to FIG. 1, scanner module 160 includes guide posts 161 protruding from the surface 165 of scanner module 160 that mates with keyboard shell 102. Guide posts 161 insert into recess apertures 164 on the rear surface 103 of keyboard shell 102, thereby mating the scanner module 160 with the keyboard shell 102. Connector 162 on the scanner module 160 couples to a mating connector 115 on the rear surface 103 of keyboard shell 102. As is the case for input device 130–150, scanner module 160 can easily be replaced with other scanner modules or input devices as desired.

The keyboard shell 102 includes one or more expansion ports 126. Six expansion ports 126 are shown for illustration purposes in FIG. 1, but other numbers of expansion ports may be desired. These expansion ports couple to the computer system through cable 125 as discussed in more detail below with respect to FIG. 3. In accordance with the preferred embodiment, the expansion ports are universal serial bus (USB) expansion ports. The USB expansion ports 126 provide the modular keyboard system 100 with the flexibility to accept any USB-based device such as MIDI devices, virtual devices, infrared ("IR") and radio frequency ("RF") devices, a mouse, game pads, advanced gaming devices, drawing pads and tablets, modems, and toys. Thus, rather than connecting such devices to connectors on the back panel of a computer chassis, the devices can easily be connected to the modular keyboard assembly.

Figure 2:
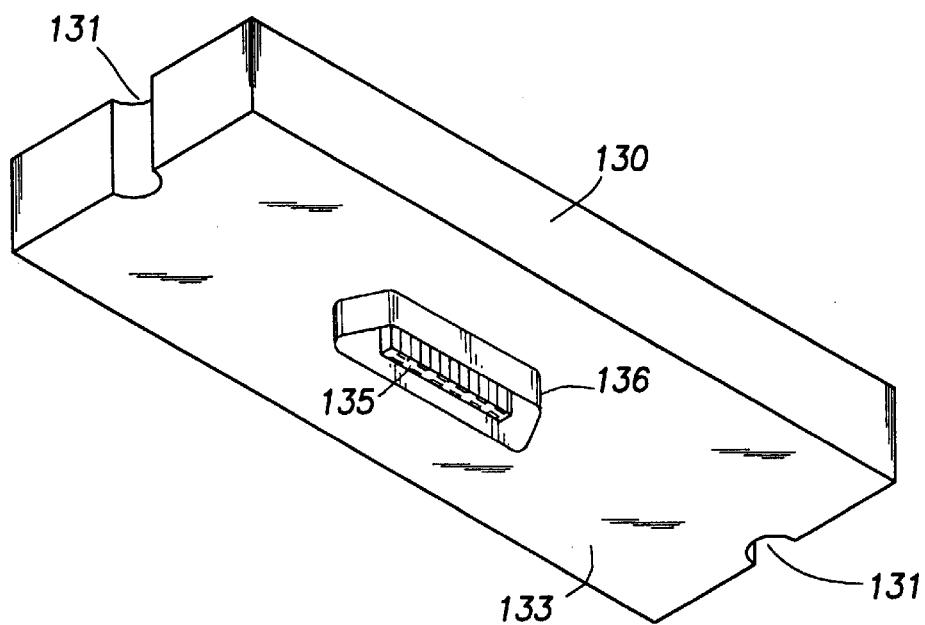
FIG. 2 is an inverted perspective view of a connector as it would be positioned on the bottom surface of an input device module for connecting that module to the keyboard shell of FIG. 1.

To the extent that different input device modules have different electrical interfaces, the dimensions of the recessed openings may be differentiated such as that shown in FIG. 1 to preclude input device modules being connected to incompatible keyboard assembly interfaces. Input device modules (such as a mouse and a track ball) that have identical electrical interfaces preferably are manufactured to fit in the same recessed opening (opening 110, for example), and not to fit in openings in which input device types are inserted that are incompatible.

refering now to FIGS. 1 and 2, the connectors used to couple the input device modules to the keyboard shell 102 include a male and a female pair of connectors. The male connectors preferably are located on the input device modules as connectors 136, 146, 156, 162 and the mating female connectors are located in the keyboard shell 102 as connectors, 105, 111, 115, 121. Any suitable connectors can be used such as the AMP Champ 50 connector manufactured by Amphenol. This type of connector includes a blade 135 shown in detail in FIG. 2. The blade 135 includes multiple electrical contacts as shown. Although connectors with pins are acceptable as well, bladed connectors are preferred to minimize the risk of damage to the connectors, as pins are susceptible to being bent or broken when mating together two connectors. The number of contacts in the connectors must at least equal the number of power, ground, and logic signals needed for each input device module. More contacts than the number required are acceptable and may be preferred to provide flexibility for future upgrades of input device modules that might require additional signals than input modules presently available. The AMP Champ 50 connector includes 50 contacts.

The mating female connectors (connectors 105, 111, 115, 121) include a slot 107, 113, 123 (no slot is shown for female connector 115 in FIG. 1) into which the blade from the male connector from the input device module inserts. Contacts in the slots of female connectors 105, 111, 115, 121 mate with contacts on the blades thereby providing an electrical path for the signals between the input device modules 130–160 and the keyboard shell 102.

Figure 3:
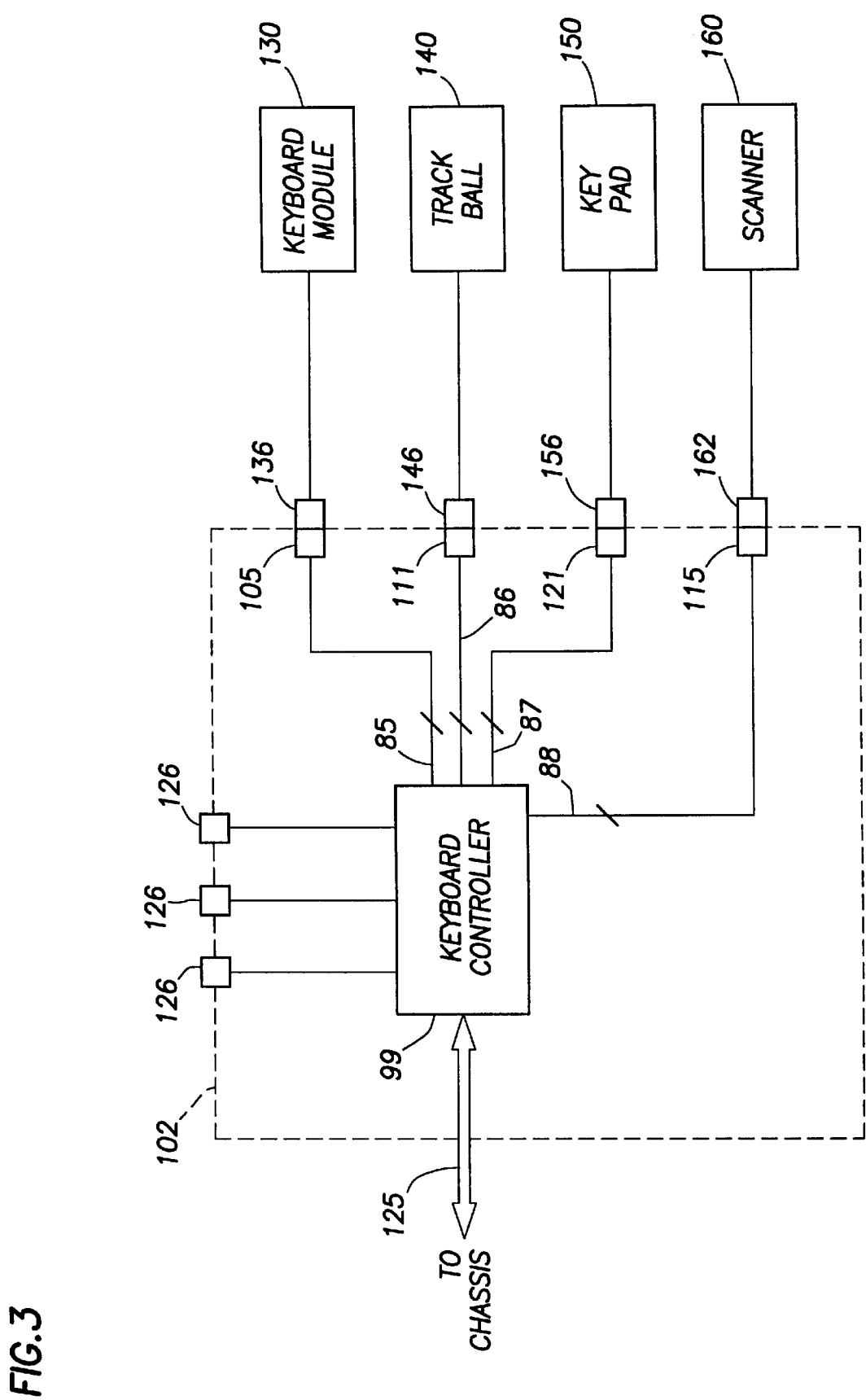
FIG. 3 is a block diagram of the electrical interconnections of the modular keyboard in accordance with a preferred embodiment.

Referring now to FIG. 3, by way of an electrical interconnection block diagram, the modular keyboard shell 102 includes a keyboard controller 99 and electrical connections to the computer chassis via cable 125, expansion ports 126, and input device modules 130, 140, 150, 160. The keyboard controller 99 includes commonly available keyboard controllers suitable for use with the preferred embodiment of the invention. As known to those of ordinary skill in the art, the keyboard controller controls the operation of the input device modules and devices coupled to the expansion ports and provides information from these devices to the computer system via cable 125 in accordance with known techniques. In accordance with the preferred embodiment, the keyboard controller includes a USB controller and the expansion ports include USB expansion ports. Consistent with FIG. 1, the input device modules include a keyboard module 130, trackball 140, keypad 150, and scanner 160 and couple to the keyboard shell 102 via connectors 136 and 105, 146 and 111, 156 and 121, and 162 and 115. Keyboard shell connectors 105, 111, 121, and 115 couple to the keyboard controller 99 via lines 85, 86, 87, and 88.

The keyboard controller 99 preferably determines the type of each input device module coupled to the controller using any one of a variety of techniques known to those of ordinary skill in the art. For example, two or more pins can be dedicated on each keyboard shell connector for use in providing an identification code for the input device module connected to that connector. With this technique, pull-up resistors preferably couple the signals from the identification pins to logic high values. As such, an input device module can assert a logic low value on an identification pin by pulling that pin to a logic low value. Conversely, the input device module can cause an identification pin to rise to a logic high level by not actively asserting a signal on the pin, thereby allowing the voltage level on the pin to be asserted high by way of the pull-up resistor coupled to the pin. Upon boot-up of the computer system, the keyboard controller 99 reads the identification pins to determine the types of input device modules coupled to the keyboard shell 102. In response, the keyboard controller 99, in conjunction with the computer's host processor, loads appropriate software drivers for controlling the operation of each input device module as would be known by those of ordinary skill. By periodically polling the identification pins, keyboard controller 99 also determines the type of input device module when an input device module is replaced while the computer is powered on.

Figure 4:
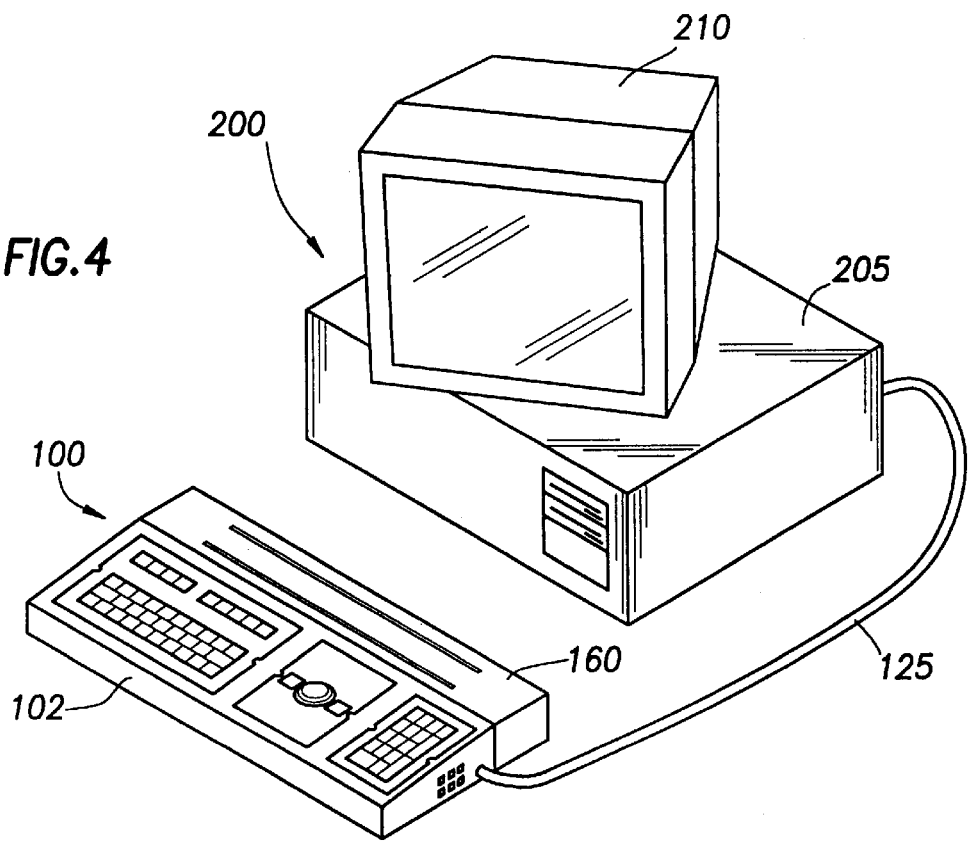
FIG. 4 is a perspective view of a computer system including the modular keyboard assembly of FIG. 1 in accordance with the preferred embodiment.

Referring now to FIG. 4, a computer system 200 in accordance with the preferred embodiment includes a chassis 205, monitor 210, and the modular keyboard assembly 100. Modular assembly 100 couples to the chassis 205 via electrical cable 125. The electrical cable 125 includes multiple conductors through which electrical signals pass between modular keyboard assembly 100 and chassis 205. By inserting an input device module into keyboard shell 102, electrical connections are established between each input device module and the computer's chassis 205, as described above with respect to FIG. 3, without the need for the user to mate an additional cable between each input device and the chassis.

The preferred embodiment of the invention provides considerable flexibility in configuring a keyboard system. The keyboard system can be configured at the factory to meet the needs of each purchaser. Further, as the needs of a computer user change, the user can reconfigure the keyboard system by easily and quickly replacing the existing input device modules with different modules.

Numerous variations and modifications will become apparent to those skilled in the art once the above disclosure is fully appreciated. It is intended that the following claims be interpreted to embrace all such variations and modifications.

What is claimed is:

1. A computer system comprising:
   a chassis;
   a computer monitor coupled to said chassis; and
   a modular, reconfigurable keyboard coupled to said chassis by an electrical cable, wherein said modular, reconfigurable keyboard includes:
   a plurality of recessed openings for receiving a corresponding plurality of input device modules wherein each recessed opening includes:
   a fixed opening in an upper surface of the modular, reconfigurable keyboard, wherein said fixed opening is distinct from the fixed openings of other recessed openings;
   a recessed surface provided with a connector for connecting to a mating connector on an input device module received into said recessed opening; and a keyboard controller configured to couple to each of the input device modules received into said openings and configured to interface the input device modules to the electrical cable.

2. The computer system of claim 1 wherein each recessed opening further includes at least one guide rail for aligning an input device module in said recessed opening, wherein said guide rail is oriented perpendicular to the recessed surface.

3. The computer system of claim 2 wherein each recessed opening includes two guide rails.

4. The computer system of claim 3 wherein said plurality of recessed openings includes a first recessed opening for receiving a keyboard input device.

5. The computer system of claim 4 wherein said plurality of recessed openings includes a second recessed opening for receiving a display pointing and selection device.

6. The computer system of claim 4 wherein said plurality of recessed openings includes a second recessed opening for receiving a display pointing and selection device that includes a trackball.

7. The computer system of claim 4 wherein said plurality of recessed openings includes a second recessed opening for receiving a display pointing and selection device that includes a mouse.

8. The computer system of claim 1 further including a plurality of expansion ports coupled to said keyboard controller.

9. The computer system of claim 8 wherein said connectors in said recessed openings include identification pins for coupling to said input device modules, said keyboard controller and pull-up resistors, and said identification pins include signals whose logic levels can be set by said input device modules to represent identification codes for each input device module.

10. The computer system of claim 9 wherein said keyboard controller is adapted to determine the type of input device modules coupled to said recessed openings by monitoring the signals on the identification pins and interpreting said signals.

11. The computer system of claim 10 wherein said keyboard controller comprises a USB controller and said expansion ports include USB expansion ports.

12. A modular, reconfigurable keyboard assembly for receiving a plurality of input device modules, comprising:
a keyboard shell including a plurality of connectors adapted to mate with connectors on corresponding input device modules that are received into corresponding recessed openings, wherein the recessed openings are each defined by a respective fixed opening in the keyboard shell and a respective recessed surface, wherein each recessed opening includes one of said connectors located on the recessed surface, and wherein each recessed opening further includes at least one guide rail oriented perpendicular to the recessed surface for aligning an input device module in said recessed opening; and
a keyboard controller coupled to said connectors and configured to interface the connectors to an electrical cable coupled to said controller for connecting said modular keyboard to a computer system.

13. The modular keyboard assembly of claim 12 wherein each recessed opening includes two guide rails.

14. The modular keyboard assembly of claim 12 wherein said recessed openings include a first recessed opening for receiving a keyboard input device.

15. The modular keyboard assembly of claim 14 wherein said recessed openings include a second recessed opening for receiving a display pointing and selection device that includes a trackball.

16. The modular keyboard assembly of claim 14 wherein said recessed openings include a second recessed opening for receiving a display pointing and selection device that includes a mouse.

17. The modular keyboard assembly of claim 14 wherein said recessed openings include a second recessed opening for receiving a display pointing and selection device.

18. A modular, reconfigurable keyboard assembly for receiving a plurality of input device modules, comprising:
a keyboard shell including a plurality of connectors for mating to corresponding input device modules that are received into corresponding recessed openings, wherein the recessed openings are each defined by a respective fixed opening in the keyboard shell and a respective recessed surface, wherein each recessed opening includes one of said connectors located on the recessed surface; and
a keyboard controller coupled to said connectors and configured to interface the connectors to an electrical cable coupled to said controller for connecting said modular keyboard to a computer system,
wherein said connectors in said recessed openings include identification pins for coupling to respective pull-up resistors, said input device modules, and said keyboard controller, and wherein said identification pins include signals whose logic levels can be set by said input device modules to represent identification codes for each input device module.

19. The modular keyboard assembly of claim 18 wherein said keyboard controller is adapted to determine the type of input device modules coupled to said recessed openings by monitoring the signals on the identification pins and interpreting the signals.

20. The modular keyboard assembly of claim 19 wherein said keyboard controller comprises a USB controller.

21. The modular keyboard assembly of claim 20 further including a plurality of USB expansion ports coupled to said keyboard controller.

* * * * *